United States Patent
Roman

(10) Patent No.: US 10,274,976 B2
(45) Date of Patent: Apr. 30, 2019

(54) THERMOSTATIC VALVE HAVING A SLEEVE

(75) Inventor: Jean-Michel Roman, Perthes en Gatinais (FR)

(73) Assignee: VERNET, Ollainville (FR)

( * ) Notice: Subject to any disclaimer, the term of this patent is extended or adjusted under 35 U.S.C. 154(b) by 1468 days.

(21) Appl. No.: 13/583,916

(22) PCT Filed: Mar. 8, 2011

(86) PCT No.: PCT/FR2011/050472
§ 371 (c)(1),
(2), (4) Date: Jan. 23, 2013

(87) PCT Pub. No.: WO2011/110783
PCT Pub. Date: Sep. 15, 2011

(65) Prior Publication Data
US 2013/0112763 A1    May 9, 2013

(30) Foreign Application Priority Data

Mar. 11, 2010 (FR) ...................... 10 51743

(51) Int. Cl.
*G05D 23/185* (2006.01)
*F16K 31/00* (2006.01)
*G05D 23/02* (2006.01)

(52) U.S. Cl.
CPC ....... *G05D 23/1852* (2013.01); *F16K 31/002* (2013.01); *G05D 23/022* (2013.01)

(58) Field of Classification Search
CPC .............. G05D 23/1852; G05D 23/022; F16K 31/002; F01P 7/16
(Continued)

(56) References Cited

U.S. PATENT DOCUMENTS 3,734,405 A * 5/1973 Wagner ...................... F01P 7/16
236/34.5
4,022,377 A * 5/1977 Wagner .............. G05D 23/1333
236/34.5
(Continued)

FOREIGN PATENT DOCUMENTS

CN    1038867    *  1/1990   ............. F16K 17/38
CN    101476503   *  7/2009   ................ F01P 7/16
(Continued)

OTHER PUBLICATIONS

Jun. 5, 2011 International Search Report of PCT Application No. PCT/FR2011/050472 file on Mar. 8, 2011.

*Primary Examiner* — Jianying Atkisson
*Assistant Examiner* — Meraj A Shaikh
(74) *Attorney, Agent, or Firm* — Knobbe, Martens, Olson & Bear, LLP

(57) ABSTRACT

A valve includes a housing which defines openings for the inlet and outlet of a fluid. The valve also includes a sleeve for controlling the circulation of the fluid through the housing. The movement of the sleeve along its axis is controlled by a thermostatic element. In order to improve the maximum flow of fluid that the valve can take in, the valve further includes a seat part, which is fixedly mounted in the housing and which includes a fluid-tight wall. One of the two opposite surfaces of the wall extends transversally to the axis of the sleeve and defines a seat bearing the sleeve. The other one of these two opposite surfaces defines, between it and a wall of the housing according to the direction of the axis of the sleeve, a free volume wherein exists one of the openings and via which the fluid flows, being distributed over the entire periphery of the sleeve when this sleeve is in its open position.

16 Claims, 3 Drawing Sheets

(58) Field of Classification Search
USPC .............. 236/93, 93 A, 100, 99 J, 99 K
See application file for complete search history.

(56) References Cited

U.S. PATENT DOCUMENTS

| | | | | |
|---|---|---|---|---|
| 4,562,953 A * | 1/1986 | Duprez | ............. | G05D 23/1333 236/34.5 |
| 5,992,755 A * | 11/1999 | Kuze | ............. | G05D 23/1333 236/34.5 |
| 6,213,060 B1 * | 4/2001 | Kuze | ............. | F01P 7/08 123/41.1 |
| 6,244,516 B1 * | 6/2001 | Langervik | ............. | F01P 7/16 236/93 R |
| 6,820,817 B2 * | 11/2004 | Leu | ............. | F01P 7/167 236/100 |
| 7,721,974 B2 * | 5/2010 | Inoue | ............. | G05D 23/022 123/41.08 |
| 2002/0096571 A1 * | 7/2002 | Kunze | ............. | G05D 23/022 236/34.5 |
| 2005/0181647 A1 * | 8/2005 | Dehnen | ............. | G05D 23/022 439/134 |
| 2006/0113399 A1 * | 6/2006 | Maraux | ............. | F01P 7/167 236/93 R |
| 2006/0163373 A1 * | 7/2006 | Inoue | ............. | G05D 23/022 236/93 A |
| 2007/0290059 A1 * | 12/2007 | Fishman | ............. | G05D 23/022 236/93 A |
| 2009/0206024 A1 * | 8/2009 | Bilski | ............. | B01D 27/08 210/435 |

FOREIGN PATENT DOCUMENTS

| | | | | |
|---|---|---|---|---|
| CN | 101476503 A | | 7/2009 | |
| DE | 44 10 249 | | 10/1994 | |
| DE | 4410249 | * | 10/1994 | ............. F01P 7/16 |
| EP | 1 106 883 | | 6/2001 | |
| EP | 1106883 | * | 6/2001 | ............. F16K 31/04 |
| FR | 2 919 704 | | 2/2009 | |
| FR | 2919704 | * | 2/2009 | ............. F16K 31/58 |
| WO | WO 89/12147 | * | 12/1989 | ............. E03B 7/12 |

* cited by examiner

THERMOSTATIC VALVE HAVING A SLEEVE

CROSS REFERENCE TO RELATED APPLICATIONS

This application is the U.S. National Phase of International Application No. PCT/FR2011/050472, filed Mar. 8, 2011, designating the U.S. and published as WO 2011/110783 on Sep. 15, 2011 which claims the benefit of French Patent Application No. 10 51743 filed Mar. 11, 2010.

FIELD OF THE INVENTION

This invention relates to a thermostatic valve for a fluid circulation circuit, in particular coolant for a heat engine.

BACKGROUND OF THE INVENTION

Valves provided with a sleeve for controlling of which the movement is controlled by a thermostatic element typically equip cooling circuits associated with high-capacity heat engines, in particular those used in lorries and certain motor vehicles, for which the flows of coolant required for their operation are higher than those encountered for heat engines with a lower capacity, for which the thermostatic valves used have flaps.

Indeed, using a sleeve in general makes it possible to have a stopper referred to as balanced, i.e. a stopper for which the difference in the pressures on either side of the wall of the sleeve is substantially zero according to the direction of movement of the sleeve by the thermostatic element, with this direction corresponding in practice to the axial direction of the sleeve. Inversely, in a thermostatic flap valve, the latter generally extends in a plane perpendicular to the direction of movement of the flap by the thermostatic element, in such a way that the pressure difference on either side of the flap according to this direction reaches high values, in particular when the circulation of fluid is interrupted by the flap. The energy required to separate such a flap from its seat is therefore often substantial, and this all the more so when the flow of the liquid to be controlled is substantial and flows in the direction of closing of the flap.

That said, current sleeve valves have however limits with regards to their maximum allowable flow. One of the reasons is linked to a poor peripheral supply of the sleeve: although in theory, the entire periphery of the sleeve could be made use of in order to allow the flow of the fluid through this sleeve when the latter is open, it is observed in practice that the flow of fluid supplying the interior of the sleeve is "channeled" through the opening of the inlet opening for this fluid into the housing of the valve. Indeed, when the sleeve is opened, i.e. when the sleeve is separated from its bearing seat defined by a wall of the valve housing, arranged axially across from the sleeve, the fluid tends to transit through the sleeve by entirely and exclusively flowing in the extension of the aforementioned opening. As such, EP-A-1 106 883, on which is based the preamble of claim 1, provides an example of a three-way valve, wherein the sleeve presses, via one of its axial ends, against a wall of the valve housing, separating two circulation ducts of the fluid, between which the fluid tends to transit "in a straight line" when the sleeve is separated from the aforementioned housing wall. The same applies for the valves disclosed in DE-A-44 10 249, U.S. Pat. No. 3,734,405, U.S. Pat. No. 4,022,377, FR-A-2 919 704 and US-A-2002/096571.

SUMMARY OF INVENTION

The purpose of this invention is to propose a thermostatic sleeve valve, authorizing a substantial maximum flow.

To this effect, the invention has for purpose a thermostatic valve for a fluid circulation circuit, such as defined in claim 1.

The idea at the basis of the invention is to not press the sleeve directly against a wall of the housing, but to create, according to the flow path of the fluid between the inlet and outlet openings, a free space between the bearing seat of this sleeve and one of these openings. This free space in fact allows the fluid to be distributed, inside the housing, according to the periphery of the sleeve in such a way that, when the latter is open, the fluid flows between this free space and the interior of the sleeve, over the entire periphery of the latter. In particular, when the aforementioned opening is an inlet opening for the fluid in the housing, this amounts to saying that the free space is a supply space upstream of the seat, making it possible to supply the sleeve well over its entire periphery. According to the invention, this free space is defined using a part qualified as a seat part since it defines the bearing seat of the sleeve, which is fixedly mounted inside the housing, with axial interposition of the free space. The setting up of this seat part in the housing is quick and easy, by being for example carried out at the same time as the setting up of at least one other component of the valve, which does not extend the assembly duration assembly time of the valve. Thanks to this seat part, more precisely to the free space that is defines axially in alignment with the sleeve, the valve takes in a high maximum flow of fluid.

Additional advantageous characteristics of the valve in accordance with the invention, taken separately or according to all of the combinations that are technically possible, are specified in the dependent claims 2 to 10.

BRIEF DESCRIPTION OF THE DRAWINGS

The invention shall be better understood when reading the following description, provided solely by way of example and in reference to the drawings wherein.

DETAILED DESCRIPTION OF THE EMBODIMENTS

Figure 1:
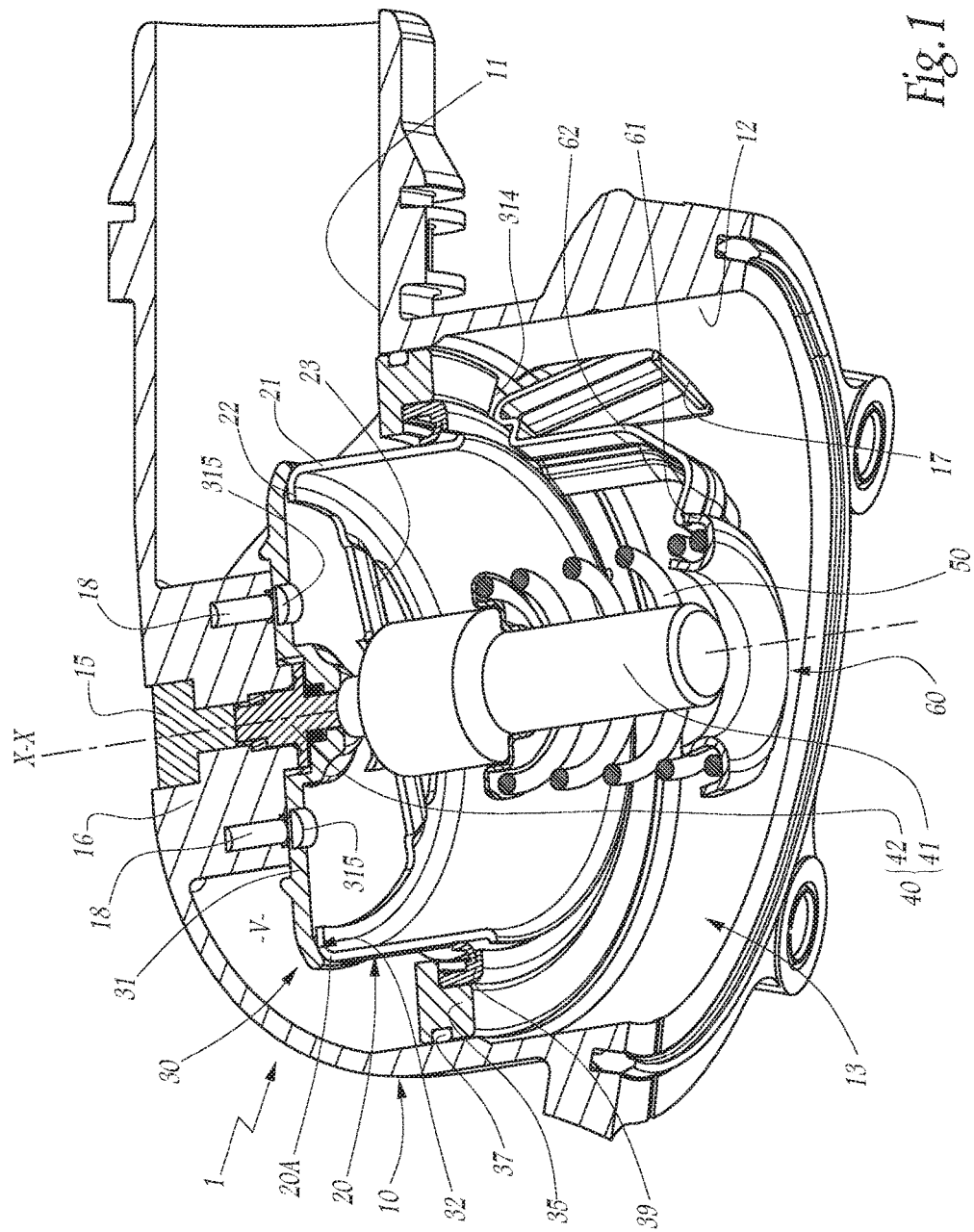
FIG. 1 is a perspective view of a valve in accordance with the invention, shown as a half cross-section.
Figure 2:
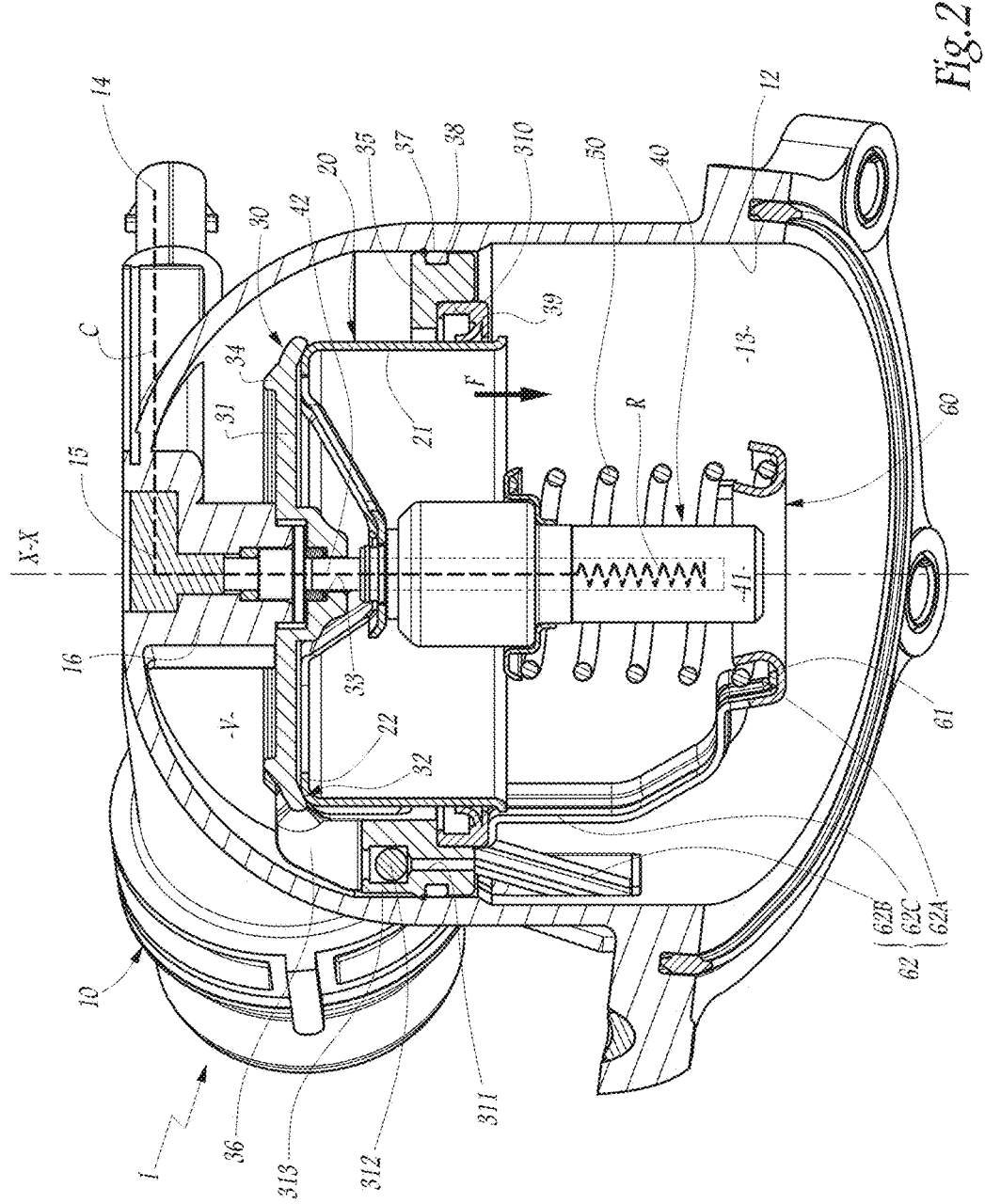
FIG. 2 is a cross-section view of the valve of FIG. 1, in a section plane different to that of FIG. 1.

FIGS. 1 and 2 show a valve 1 adapted to control the circulation of a fluid, entering into a housing 10 of the valve via an opening 11 and exiting from this housing by an opening 12, after having passed through a regulating chamber 13 wherein the openings 11 and 12 exit. In this chamber 13 are arranged a mobile sleeve 20, a fixed seat part 30 and a thermostatic element 40 for controlling the movement of the sleeve with regards to the seat part. The valve 1 is for example used in a cooling circuit of a heat engine of a vehicle.

The sleeve 20 has a generally tubular shape, centred on a longitudinal axis X-X through which pass the section planes of FIGS. 1 and 2. This sleeve is arranged in the chamber 13 in such a way that the opening 11 exits into this chamber in a way that is substantially perpendicular to the axis X-X, while, in the example embodiment being considered here, the opening 12 is globally centred on this axis.

The sleeve 20 comprises a cylindrical main body 21, centred on the axis X-X and with a circular base, of which the wall is solid over its entire periphery. At the axial end 20A of the sleeve, turned to the side of the opening 11, the body 21 is provided with an internal peripheral edge 22 from which arms 23 extend rigidly in the direction of the axis X-X. At their free end, these arms 23 are connected fixedly to a heat-conducting cup 41 of the thermostatic element 40, containing a thermoexpandable material, such as a wax. This cup 41, which extends in length in a centred manner over the axis X-X, receives interiorly a rod 42, which itself also extends in length in a centred manner over the axis X-X and which is also able to be deployed and to be retracted, via translation according to this axis, with regards to the interior of the cup 41, under the effect of a variation in the volume of the thermoexpandable material. In the portion of its end arranged to the exterior of the cup 41, the rod 42 is fixedly connected to the housing 10 by known arrangements, such as by overmolding, press fitting and/or gluing, which will not be described any further herein.

Advantageously, in the example embodiment considered here, an electric heating resistance R, shown in dotted lines on FIG. 2, is arranged inside the rod 42, carried out in this case in the form of a metal tube, in such a way that this resistance can, when it is supplied with electricity, heat the thermoexpandable material contained in the cup 41. The housing 10 is then exteriorly provided with a base 14 (FIG. 2) for connecting an external electrical power source, from which electrical conductors C extend to the terminals of the aforementioned heating resistance, being for example embedded in a insulating resin 15 added exteriorly to the housing 10.

It is understood that, when the thermoexpandable material contained in the cup 41 is heated up, its expansion causes the translation of the cup 41 along the axis X-X, in the direction opposite to the rod 42, i.e. downwards in FIGS. 1 and 2. Doing this, the cup 41 drives according to a corresponding translation movement the sleeve 20, as indicated by arrow F in FIG. 2.

According to the axial position of the sleeve 20, controlled by the thermostatic element 40, the axial end 20A of this sleeve is more or less separated from an associated wall 31 belonging to the seat part 30. More precisely, this wall 31 has the general shape of a solid disc, centred on the axis X-X and with a circular base that is substantially identical to that of the body 21 of the sleeve 20. On its surface directed towards the sleeve 20, this wall 31 defines a peripheral edge constituting a sealed bearing seat 32 for the edge 22 of the sleeve 20: in the axial position of the sleeve 20 shown in FIGS. 1 and 2, the edge 22 is as such pressed against the seat 32 of the wall 31, this edge and this seat thus cooperating via the complementarity of the shapes along their entire periphery, in such a way as to cut a flow of fluid between the exterior and the interior of the sleeve 20.

Figure 3:
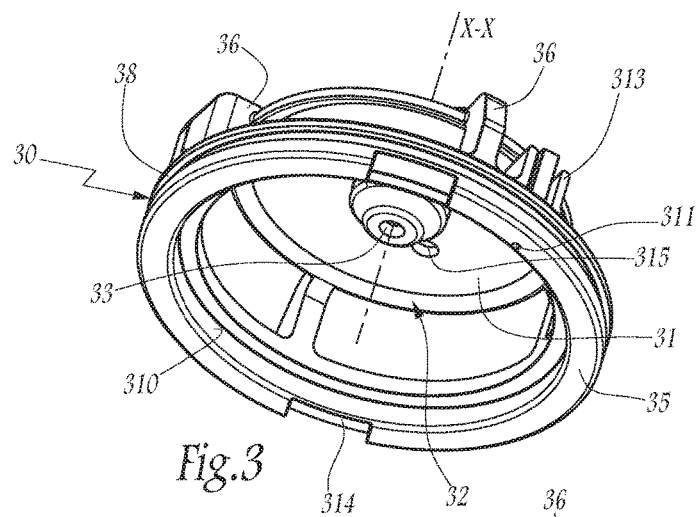
FIGS. 3 and 4 are perspective views, under different respective angles, of a seat part belonging to the valve of FIG. 1.
Figure 4:
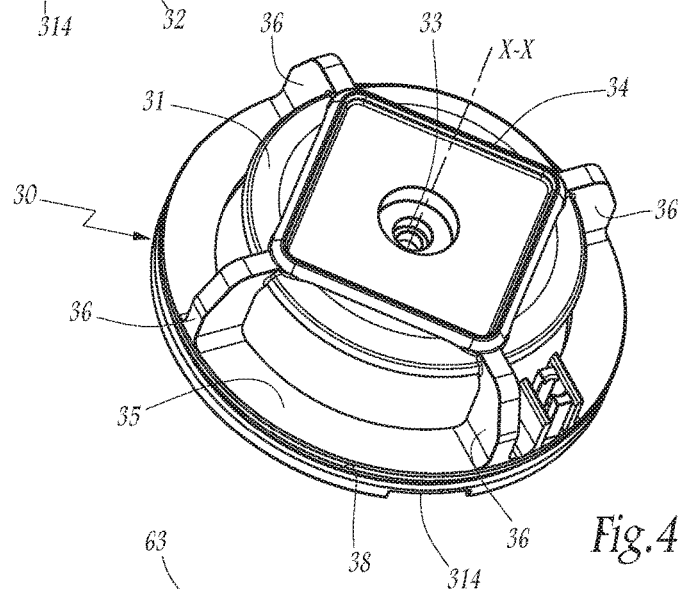

As can be easily seen in FIGS. 3 and 4, the wall 31 has a through bore 33 centred on the X axis-X and adapted to receive in a sealed manner the rod 42, as shown in FIG. 1. As such, as shown in FIGS. 1 and 2, in the housing 10, the wall 31 is arranged in such a way that its central region is located axially pressing against an internal over-thickened portion 16 of the housing 10, to which the rod 42 is fixedly connected and through which the electric heating resistance R internal to this rod is supplied with electricity.

On the other hand, the peripheral region of the wall 31 is not pressing against the housing over-thickened portion 16, but, on the contrary, is separate, according to the direction of the axis X-X, from the wall of the housing 10 from which this over-thickened portion 16 extends protruding towards the interior of the chamber 13. In this way, the peripheral region of the wall 31 and the aforementioned wall of the housing 10 define between them, according to the direction of the axis X-X, a free space V, which belongs to the chamber 13, which surrounds the housing over-thickened portion 16 and which, in the example embodiment considered here, has a global annular shape, centred on the axis X-X.

As can be easily seen in FIG. 1, the opening 11 opens freely into the free space V: moreover, in the embodiment considered here, the free space V is located, according to a direction perpendicular to the axis X-X, in the straight extension on the one hand substantial, approximately half, of the opening of opening 11 into the chamber 13. Advantageously, the surface of the wall 31, which defines the free space V, is provided with reinforcement ribs 34, easily seen in FIG. 4.

In service, when the opening 11 is supplied with fluid to be controlled by the valve 1, this fluid penetrates into the chamber 13, filling at least partially the free space V: the fluid is as such distributed over the entire periphery of the sleeve 20 in such a way that, when this sleeve is moved from its closed position, shown in FIGS. 1 and 2, to an open position in which its end 20A is axially distant from the seat 32, the fluid flows inside the sleeve 20, passing between the arms 23, and this over the entire periphery of the sleeve. It is understood that the valve 1 is capable of taking in a substantial flow of fluid passing through it, with the entire periphery of the sleeve being made use of to authorize the flow of fluid through this valve when the sleeve is in open position. The interest of the ribs 34 is thus to avoid a significant deformation of the wall 31, under the action of a high flow of fluid.

Moreover, the seat part 30 advantageously includes a crown 35 which, as can be easily seen in FIGS. 3 and 4, is co-axial to the wall 31, while being located at a different axial level from the latter. Elbow arms 36, distributed in a substantially regular manner according to the periphery of the seat part 30, rigidly connect the wall 31 and the crown 35. In the valve 1, as shown in FIGS. 1 and 2, the crown 35 is arranged is such a way, on the one hand, as to be located axially between the openings 11 and 12 and, on the other hand, to be radially interposed between the body 21 of the sleeve 20 and the housing 10. According to its external periphery, the crown 35 forms with the housing 10 a fixed contact, sealed by a seal 37 which, in the example embodiment shown, is retained in a peripheral groove 38 of the crown. On its inner periphery, the crown 35 forms with the body 21 of the sleeve 20 an axially sliding contact, sealed by a lip seal 39. This lip seal 39 is received in a complementary peripheral indentation 310 of the crown 35.

As such, the crown 35 insulates in a sealed manner the openings 11 and 12 one in relation to the other, around the sleeve 20. In other words, to the exterior of this sleeve, the crown 35 compartmentalizes the chamber 13 into two separate portions in a sealed manner, with one of them in free communication with the opening 11 while the other in communication with the opening 12.

In service, when the opening 11 is supplied with fluid to be controlled by the valve 1, the crown 35 reinforces the effect of the wall 31 described hereinabove, allowing for the supplying of the sleeve 20 over its entire periphery: indeed, with regards to the radial dimension of the crown 35, the free space V of peripheral supply of the sleeve 20 is, somewhat, extended axially all around this sleeve, as such increasing the maximum allowable flow of the valve 1. When the sleeve 20 is in its open position, the fluid penetrates inside this sleeve, passing between the arms 36, without the latter inducing any significant resistance to the flow, in light of their low thickness.

In practice, the seat part 30 also has the interest of being able to be mounted quickly and easily inside the housing 10, provided beforehand with the joint 37 and the lip seal 39. In addition, as in the example embodiment considered in the figures, this seat part 30 is manufactured beforehand in a single part, in particular via moulding a plastic material. In terms of an alternative not shown, the seal 37 and/or lip seal 39 are directly overmolded on the seat part 30.

As an advantageous option, the crown 35 incorporates a degassing function. More precisely, as shown in FIG. 2, the crown 35, according to the direction of the axis X-X, has a through bore 311 of which the outlet, on the side of the opening 11, can be sealed with a ball 312. This ball can be moved in relation to the crown 35, being retained by a cage 313, integral with the crown, here integrally formed with the latter. In this way, when the opening 11 is supplied with a fluid to be controlled by the valve 1, this fluid presses the ball 312 against the outlet of the hole 311, thus blocking the latter in a sealed manner. On the other hand, when the air is trapped inside the housing 10, on the side of the opening 12, in particular during the filling under pressure of the circuit wherein the valve 1 is incorporated, for its initial putting into service or following maintenance intervention, while the sleeve 20 is in its closed position, the ball 312 allows this trapped air to escape into the portion of the chamber 13 in communication with the opening 11.

Moreover, the valve 1 further comprises a return spring 50 of the cup 41 towards the rod 42, arranged co-axially around this cup. This spring 50 is retained in relation to the housing 10 by a part 60 which, advantageously, also provides for the retaining of the seat part 30.

Figure 5:
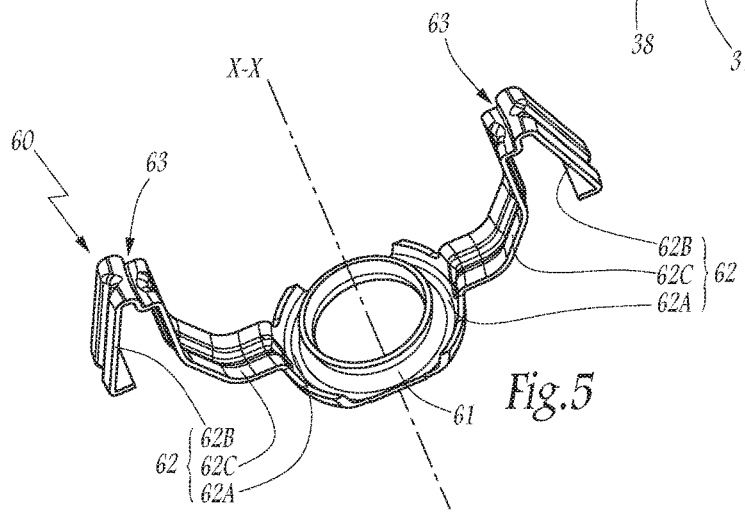
FIG. 5 is a perspective view of a part of a retaining part belonging to the valve of FIG. 1.

More precisely, as can easily be seen in FIG. 5, this retaining part 60 includes an annular crown 61, which is centred on the axis X-X and against which is pressed the end of the spring 50, opposite that bearing against the cup 41. The retaining part 60 further comprises two arms 62 which extend from two diametrically opposite zones 62A of the collar 61. Opposite the crown 61, each arm 62 includes an end portion 62B forming a lug fixedly connected to the housing 10, being received in a complementary cavity 17 defined interiorly by the housing, as shown in FIGS. 1 and 2. Advantageously, the peripheral dimension of this end portion 62B is substantially equal to that of the cavity 17 for the purposes of the relative blocking in rotation around the axis X-X, by adjusting shapes.

Between its end portions 62A and 62B, each arm 62 has an elbowed running portion 62C having globally the shape of a U turned towards the opening 12: the bottom of this U shape is adapted to axially support the crown 35 of the seat part 30, advantageously by retaining the lip seal 39 in its reception indentation 310. To do this, the running portion of arm 62C has, on its surface directed towards the opening 11, a complementary surface 63 of the surfaces across from the crown 35 and of the lip seal 39. Advantageously, the aforementioned surface of the crown 35 is arranged at the bottom of an indentation 314 of this crown, of which the peripheral dimension is substantially equal to that of the surface 63 of the arm 62 for the purposes of relative blocking in rotation around the axis X-X, by adjusting shapes.

Of course, U shape of the running portion 62C of the arms 62 is provided in order to not interfere with the body 21 of the sleeve 20 during translational movements of the latter according to the axis X-X.

In order to facilitate the setting up of the retaining part 60 inside the housing 10, this part 60 has a capacity of elastic deformation radially to the axis X-X: in practice, in the example embodiment considered here, this amounts to say that each lug 62B is pulled back elastically against the running portion 62C during the axial introduction of the part 60 inside the housing 10, then, after the release of this lug, the latter is introduced into the receiving cavity 17, via the elastic return effect.

Various arrangements and alternatives to the thermostatic valve 1 described until now can moreover be considered. By way of example:

as a complement or as a replacement to the axial retaining action of the seat part 30 by the retaining part 60, the part 30 can be fixed directly to the housing 10 by any suitable mechanical means; in order to show this alternative, FIG. 1 shows that the over-thickened portion 16 of the housing 10 defines, in its surface against which the wall 31 is pressing, two holes 18 for receiving fastening screws not shown, noting that these holes 18 are drawn in axial alignment with two socket screws 315 defined in the surface of the wall 31 turned towards the sleeve 20, these socket screws as such making it possible to locate and to facilitate the setting into place of the aforementioned screws;

the geometry of the housing 10 can be modified in relation to that considered in the figures, in particular to adapt to the installation environment of the valve 1 and/or in order to facilitate the manufacture thereof; moreover, at least one other opening can be provided in addition to the opening 11 in order to supply the valve with fluid; likewise, at least one other opening than the opening 12 can be provided for the outlet of the fluid; in this later case, in a manner known per se, the cup 41 of the thermostatic element 40 can be extended by a bar provided with a mobile flap for the purposes of controlling the adjustment of the circulation of the fluid between the various outlet openings, in particular in order to provide a by-pass function in the cooling circuit of a heat engine;

the valve 1 can be used in cooling circuits with a direction of circulation of the fluid that is inversed in relation to that described until now, i.e. with a fluid inlet at least via the opening 12 and a fluid outlet at least via the opening 11;

other embodiments than the ball 312 can be considered in order to constitute, on the crown 35, a mobile valve for cutting off the degassing hole 311; and/or the shape and the number of arms 62 of the retaining part 60 are not limited to those shown in the figures; as such, by way of example, the shape of these arms 62 can be provided as substantially planar, rather than of a U shape; and/or the thermostatic element 40 can be functionally linked to the rest of the valve 1 in a manner that is inverse to that considered in the example shown in the figures; in other words, in this case, it is the cup 41 which is fixedly connected to the housing 10 while the rod 42 pushes on the sleeve 20 in order to drive it in movement; such an arrangement can in particular be considered when it is renounced to control the valve 1 via a electric heating resistance, internal to the rod 42.

What is claimed is:

1. A thermostatic valve for a fluid circulation circuit, the valve comprising:

a housing, which comprises at least two openings for an inlet and an outlet of a fluid circulating through the housing, and which includes a wall of the housing from which an over-thickened portion of the housing protrudes towards inside the housing, a sleeve for controlling circulation of the fluid through the housing, the sleeve comprising a tubular body defining a central axis according to which the sleeve is mobile with respect to the housing between a closed position in which an axial end of the tubular body is pressed in a sealed manner against a seat that is fixed with respect to the housing so as to cut off a fluid flow between said at least two openings, and an open position in which the axial end of the tubular body is axially separated from the seat so as to authorise the fluid flow, a thermostatic element, containing a thermoexpandable material and comprising:
  a fixed portion, inside which an electric heating resistance is arranged and which is fixedly connected to the over-thickened portion of the housing so that the electric heating resistance is suppliable with electricity from outside the housing through the over-thickened portion, and
  a mobile portion which is movable with respect to the fixed portion as resulting from a volume variation of the thermoexpandable material and which is kinetically linked to the sleeve in such a way as to control motion of the sleeve between the closed position and the open position, and a seat part, which is separate from the housing, which is fixedly mounted in the housing and which comprises a fluid-tight wall including a central region and a peripheral portion, wherein said central region of the fluid-tight wall is traversed by the central axis and is axially pressed against the over-thickened portion of the housing, wherein the peripheral region of the fluid-tight wall is not pressed against the over-thickened portion of the housing, is axially away from said wall of the housing and has first and second faces which both extend transversally to the central axis and which are opposite one other, wherein the first face of the peripheral region of the fluid-tight wall faces the tubular body of the sleeve and comprises said seat, and wherein the second face of the peripheral region of the fluid-tight wall faces said wall of the housing so that a free space is defined axially between the second face of the peripheral region of the fluid-tight wall and said wall of the housing and surrounds the over-thickened portion of the housing, one of said at least two openings exiting into said free space, and the fluid flow going through said free space and being distributed over an entire periphery of the tubular body of the sleeve when the sleeve is in the open position.

2. The valve according to claim 1, wherein one of said at least two openings exits into said free space along a direction that is substantially perpendicular to the central axis.

3. The valve according to claim 1, wherein the fixed portion of the thermostatic element axially passes through in a sealed manner the central region of the fluid-tight wall of the seat part.

4. The valve according to claim 1, wherein, in a transversal cross-section to the central axis, the fluid-tight wall and the tubular body of the sleeve have respective exterior profiles which are coaxial and substantially identical.

5. The valve according to claim 1, wherein the seat part further comprises a crown, which is located axially between said at least two openings and which is radially interposed between the tubular body of the sleeve and the housing in such a way as to form, along an external periphery of the crown, a sealed fixed contact with the housing as well as, along an internal periphery of the crown, a sliding sealed contact with the tubular body of the sleeve.

6. The valve according to claim 5, wherein the fluid-tight wall and the crown of the seat part are coaxial and connected together by elbow arms distributed in a substantially regular manner around their common axis.

7. The valve according to claim 5, wherein the crown comprises a peripheral lip seal.

8. The valve according to claim 5, wherein the crown comprises a degassing duct which passes axially through the crown, and wherein the crown further comprises a valve for cutting off the degassing duct, which is movable with respect to the crown as resulting from a fluid action.

9. The valve according to claim 1, wherein the valve further comprises a retaining part, which is fixedly connected to the housing and which is adapted to axially support both the seat part and a return spring for returning the mobile portion towards the fixed portion of the thermostatic element.

10. The valve according to claim 9, wherein the retaining part comprises arms distributed around the central axis of the sleeve, each arm comprising:
  a first end portion which absorbs the constraints produced by the return spring,
  a second end portion, opposite the first end portion, which cooperates mechanically with the housing so as to fasten the arm to the housing, and
  a running portion which is globally conformed in a U shape against a bottom of which axially bears the seat part.

11. The valve according to claim 10, wherein the seat part further comprises a crown, wherein the crown is located axially between said at least two openings and is radially interposed between the tubular body of the sleeve and the housing in such a way as to form, along an external periphery of the crown, a sealed fixed contact with the housing as well as, along an internal periphery of the crown, a sliding sealed contact with the tubular body of the sleeve, and wherein the crown axially bears against the bottom of said U shape of the running portion of each arm.

12. The valve according to claim 10, wherein the seat part further comprises a crown, wherein the crown is located axially between said at least two openings and is radially interposed between the tubular body of the sleeve and the housing in such a way as to form, along an external periphery of the crown, a sealed fixed contact with the housing as well as, along an internal periphery of the crown, a sliding sealed contact with the tubular body of the sleeve, and wherein the crown is interiorly provided with a peripheral lip seal that axially bears against the bottom of said U shape of the running portion of each arm.

13. The valve according to claim 1, wherein the fluid is a coolant for a heat engine.

14. The valve according to claim 1, wherein the sleeve comprises arms on a first end of the sleeve and an opening on a second end of the sleeve, wherein in the open position, the fluid flows between the arms into and through the tubular body between the first opening and the second opening.

15. The valve according to claim 1, wherein the fluid-tight wall has a discoidal shape centred on the central axis.

16. The valve according to claim 1, wherein said free space has an annular shape centred on the central axis.

* * * * *